(12) United States Patent
Choi et al.

(10) Patent No.: US 11,735,930 B2
(45) Date of Patent: Aug. 22, 2023

(54) ENERGY HUB FOR ENERGY STORAGE SYSTEM RACKS BASED ON SOC AND SOH

(71) Applicant: LG CHEM, LTD., Seoul (KR)

(72) Inventors: Yean Sik Choi, Daejeon (KR); Seong Yeol Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 375 days.

(21) Appl. No.: 16/992,878

(22) Filed: Aug. 13, 2020

(65) Prior Publication Data

US 2021/0194255 A1 Jun. 24, 2021

(30) Foreign Application Priority Data

Aug. 5, 2019 (KR) ........................ 10-2019-0095016

(51) Int. Cl.
*H02J 7/00* (2006.01)
*B60L 58/18* (2019.01)

(52) U.S. Cl.
CPC .......... *H02J 7/00032* (2020.01); *B60L 58/18* (2019.02); *H02J 7/005* (2020.01); *H02J 7/0013* (2013.01); *H02J 7/0029* (2013.01); *H02J 7/0048* (2020.01); *H02J 7/0047* (2013.01); *H02J 7/00712* (2020.01); *H02J 7/007188* (2020.01)

(58) Field of Classification Search
CPC .... H02J 7/00032; H02J 7/0013; H02J 7/0029; H02J 7/0048; H02J 7/005; B60L 58/18
USPC ......................................................... 320/134
See application file for complete search history.

(56) References Cited

U.S. PATENT DOCUMENTS

| | | | | |
|---|---|---|---|---|
| 7,615,967 B2* | 11/2009 | Cho | ..................... | G01R 31/392 320/132 |
| 7,683,579 B2* | 3/2010 | Kim | ..................... | H02J 7/00306 320/132 |
| 8,134,338 B2* | 3/2012 | Choi | ..................... | B60L 58/20 320/155 |
| 8,265,890 B2* | 9/2012 | Suzuki | ..................... | H02J 7/00 702/63 |
| 8,353,374 B2* | 1/2013 | Sugawara | ............. | H01M 50/20 180/68.5 |
| 8,427,098 B2* | 4/2013 | Moore | ..................... | H02J 7/35 307/64 |

(Continued)

FOREIGN PATENT DOCUMENTS

| | | | |
|---|---|---|---|
| JP | 2009159672 A | * | 7/2009 |
| JP | 2012-523215 A | | 9/2012 |

(Continued)

*Primary Examiner* — John T Trischler
(74) *Attorney, Agent, or Firm* — Birch, Stewart, Kolasch & Birch, LLP (57) ABSTRACT

An energy hub apparatus includes a first communicator for receiving state of charge (SOC) information and state of health (SOH) information from a plurality of battery management systems (BMSs), each BMS monitors and controls an energy storage system (ESS) rack, a controller for determining at least one to perform discharging or charging using at least one of load output information, SOC information, and SOH information received from an external device among the plurality of ESS racks, and an energy storage for receiving power from the at least one ESS rack and transmitting the power to an external load.

15 Claims, 5 Drawing Sheets

(56) References Cited

U.S. PATENT DOCUMENTS

| | | | | |
|---|---|---|---|---|
| 8,486,548 B2* | 7/2013 | Ueda | H01M 10/441 | 429/61 |
| 8,575,777 B2* | 11/2013 | Tae | B60L 58/26 | 320/136 |
| 8,583,389 B2* | 11/2013 | Aoshima | B60L 50/64 | 702/63 |
| 8,638,061 B2* | 1/2014 | Moore | H02J 7/342 | 307/64 |
| 8,810,203 B2* | 8/2014 | Abe | H01M 10/48 | 320/132 |
| 8,922,168 B2* | 12/2014 | Ko | G01R 31/367 | 320/132 |
| 8,933,671 B2* | 1/2015 | Lee | H02J 7/04 | 320/135 |
| 9,013,152 B2* | 4/2015 | Kawamoto | H02J 3/322 | 320/134 |
| 9,077,187 B2* | 7/2015 | Tang | H02J 7/34 | |
| 9,293,935 B2* | 3/2016 | Lee | H01M 10/4207 | |
| 9,360,531 B2* | 6/2016 | Suh | G01R 31/367 | |
| 9,431,852 B2* | 8/2016 | Hirata | H02J 9/061 | |
| RE46,156 E* | 9/2016 | Moore | H02J 7/0025 | |
| 9,444,273 B1* | 9/2016 | Gothoskar | H04W 4/20 | |
| 9,488,977 B2* | 11/2016 | Cho | B60L 58/10 | |
| 9,537,328 B2* | 1/2017 | Kim | H02J 7/0014 | |
| 9,559,530 B2* | 1/2017 | Lee | H02J 13/00002 | |
| 9,564,762 B2* | 2/2017 | Lee | H02J 7/0016 | |
| 9,634,510 B2* | 4/2017 | Choi | H02J 3/32 | |
| 9,678,165 B2* | 6/2017 | Joe | G01R 31/382 | |
| 9,891,685 B1* | 2/2018 | Marr | G06F 1/30 | |
| 9,910,471 B1* | 3/2018 | Marr | G06F 1/26 | |
| 9,987,940 B2* | 6/2018 | Uyeki | B60L 53/30 | |
| 10,073,145 B2* | 9/2018 | Kim | H01M 10/425 | |
| 10,084,334 B1* | 9/2018 | Dao | H02J 7/0031 | |
| 10,141,751 B2* | 11/2018 | Arita | H02J 7/0019 | |
| 10,160,444 B2* | 12/2018 | Kamatani | G01R 31/392 | |
| 10,180,460 B1* | 1/2019 | Castelaz | H02J 7/0014 | |
| 10,193,190 B2* | 1/2019 | Yamazoe | H01M 10/4207 | |
| 10,211,651 B2* | 2/2019 | Park | H01M 10/48 | |
| 10,283,974 B2* | 5/2019 | Macris | G01R 31/3842 | |
| 10,284,009 B2* | 5/2019 | Park | H02J 7/00 | |
| 10,330,732 B2* | 6/2019 | Roumi | G01R 31/367 | |
| 10,358,043 B2* | 7/2019 | Dao | H02J 7/04 | |
| 10,367,239 B1* | 7/2019 | Dao | H01M 50/296 | |
| 10,534,039 B2* | 1/2020 | Seo | G01R 31/382 | |
| 10,557,892 B2* | 2/2020 | Suzuki | G01R 31/367 | |
| 10,571,523 B2* | 2/2020 | Kim | B60L 58/22 | |
| 10,749,220 B2* | 8/2020 | Jeon | H04Q 9/00 | |
| 10,916,813 B2* | 2/2021 | Cha | G01R 31/389 | |
| 10,971,763 B2* | 4/2021 | Sung | B60L 58/21 | |
| 10,998,756 B2* | 5/2021 | Jin | H02J 3/00125 | |
| 11,011,917 B2* | 5/2021 | Park | H02J 7/0047 | |
| 11,038,216 B2* | 6/2021 | Kwon | H02J 7/00036 | |
| 11,056,732 B2* | 7/2021 | Kim | H01M 10/44 | |
| 11,056,886 B2* | 7/2021 | Kato | H01M 10/425 | |
| 11,070,067 B2* | 7/2021 | Lee | H01M 10/482 | |
| 11,073,564 B2* | 7/2021 | Roumi | G01R 31/52 | |
| 11,095,718 B2* | 8/2021 | Skaaksrud | G01C 5/06 | |
| 11,112,461 B2* | 9/2021 | Lim | H02J 7/00714 | |
| 11,125,824 B2* | 9/2021 | Lee | H01M 50/20 | |
| 11,165,263 B2* | 11/2021 | Sung | H02J 7/0031 | |
| 11,187,756 B2* | 11/2021 | Lim | G01R 31/3842 | |
| 11,205,806 B2* | 12/2021 | Sung | H02J 7/0019 | |
| 11,228,185 B2* | 1/2022 | Hensley | H02J 7/00302 | |
| 11,245,268 B1* | 2/2022 | Trippel | H02J 7/0063 | |
| 11,277,008 B2* | 3/2022 | Lee | H02J 7/0048 | |
| 11,280,842 B2* | 3/2022 | Lee | G01R 31/3648 | |
| 11,342,009 B2* | 5/2022 | Sung | G11C 7/12 | |
| 11,349,159 B2* | 5/2022 | Hwang | H02J 7/00 | |
| 11,381,094 B2* | 7/2022 | Park | H02J 7/00304 | |
| 11,391,780 B2* | 7/2022 | Bae | B60L 58/12 | |
| 11,397,217 B2* | 7/2022 | Lim | H02J 7/0048 | |
| 11,404,885 B1* | 8/2022 | Tenorio | H02J 7/0063 | |
| 11,404,887 B2* | 8/2022 | Fauteux | H01M 10/049 | |
| 11,411,407 B1* | 8/2022 | Tenorio | H02J 7/0047 | |
| 11,567,139 B2* | 1/2023 | Sakai | H01M 10/48 | |
| 2006/0284614 A1* | 12/2006 | Kim | H02J 7/00712 | 324/149 |
| 2007/0001679 A1* | 1/2007 | Cho | G01R 31/392 | 324/426 |
| 2007/0025135 A1* | 2/2007 | Yamamoto | G11C 5/141 | 365/132 |
| 2007/0029124 A1* | 2/2007 | DasGupta | H01M 16/00 | 429/231.95 |
| 2008/0211459 A1* | 9/2008 | Choi | B60L 58/22 | 320/134 |
| 2010/0055543 A1* | 3/2010 | Tae | H02J 7/005 | 429/50 |
| 2010/0063757 A1* | 3/2010 | Suzuki | H02J 7/00 | 320/134 |
| 2010/0116570 A1* | 5/2010 | Sugawara | B60L 58/27 | 429/82 |
| 2010/0136390 A1* | 6/2010 | Ueda | H01M 10/482 | 429/61 |
| 2010/0185405 A1* | 7/2010 | Aoshima | H01M 10/486 | 702/63 |
| 2010/0244574 A1* | 9/2010 | Nishino | A61B 6/00 | 307/80 |
| 2010/0244769 A1* | 9/2010 | Sakakibara | H01M 10/42 | 320/118 |
| 2010/0308765 A1* | 12/2010 | Moore | H02J 7/0025 | 320/148 |
| 2010/0318234 A1* | 12/2010 | Moore | H02J 7/35 | 700/295 |
| 2011/0228436 A1* | 9/2011 | Lee | H02J 7/0031 | 429/61 |
| 2011/0313613 A1* | 12/2011 | Kawahara | B60L 3/04 | 320/134 |
| 2012/0056591 A1* | 3/2012 | Abe | H01M 10/425 | 320/132 |
| 2012/0091967 A1* | 4/2012 | Kawamoto | H02J 3/322 | 320/134 |
| 2012/0119746 A1* | 5/2012 | Macris | H02J 7/0048 | 324/431 |
| 2012/0133333 A1* | 5/2012 | Morioka | H02J 7/0049 | 320/134 |
| 2012/0169290 A1* | 7/2012 | Nakashima | H01M 10/48 | 320/134 |
| 2012/0176091 A1* | 7/2012 | Abe | H02J 7/0029 | 320/132 |
| 2013/0076519 A1* | 3/2013 | Tang | H02J 7/34 | 340/636.15 |
| 2013/0099754 A1* | 4/2013 | Ko | G01R 31/367 | 320/134 |
| 2013/0113416 A1* | 5/2013 | Ishibashi | G05F 1/67 | 320/107 |
| 2013/0113436 A1* | 5/2013 | Ishibashi | H02J 7/0025 | 320/135 |
| 2013/0127626 A1* | 5/2013 | Yoo | H01M 10/48 | 340/636.19 |
| 2013/0166233 A1* | 6/2013 | Suh | G01R 31/382 | 702/63 |
| 2013/0211616 A1* | 8/2013 | Moore | H02J 7/0025 | 700/295 |
| 2013/0253715 A1* | 9/2013 | Cho | H04Q 9/00 | 700/286 |
| 2013/0271072 A1* | 10/2013 | Lee | H02J 7/005 | 320/108 |
| 2014/0009117 A1* | 1/2014 | Ishii | H02J 3/32 | 320/126 |
| 2014/0062203 A1* | 3/2014 | Hirata | H02J 7/34 | 307/66 |
| 2014/0091770 A1* | 4/2014 | Lee | H02J 7/04 | 320/135 |
| 2014/0306662 A1* | 10/2014 | Kim | H02J 7/0016 | 320/118 |
| 2014/0347013 A1* | 11/2014 | Kim | H02J 7/0016 | 320/134 |
| 2014/0347014 A1* | 11/2014 | Lee | H02J 7/0047 | 320/134 |

(56) References Cited

U.S. PATENT DOCUMENTS

| | | | |
|---|---|---|---|
| 2015/0028816 A1* | 1/2015 | Lee | H02J 13/00026 320/134 |
| 2015/0214754 A1* | 7/2015 | Choi | H02J 7/0069 320/134 |
| 2015/0226809 A1* | 8/2015 | Joe | H01M 4/364 324/426 |
| 2015/0263540 A1* | 9/2015 | Culbert | H02J 7/345 307/104 |
| 2016/0013670 A1* | 1/2016 | Tohara | H02J 7/0048 320/112 |
| 2016/0094085 A1* | 3/2016 | Janardhan | H02J 3/322 307/20 |
| 2016/0109522 A1* | 4/2016 | Kim | G01R 31/396 429/91 |
| 2016/0226269 A1* | 8/2016 | Hwang | B60L 3/0046 |
| 2016/0254684 A1* | 9/2016 | Gothoskar | H02J 7/0013 455/572 |
| 2016/0268642 A1* | 9/2016 | Yamazoe | H01M 10/4207 |
| 2016/0352111 A1* | 12/2016 | Arita | H02J 3/32 |
| 2016/0372942 A1* | 12/2016 | Marinov | H02J 7/0068 |
| 2017/0005497 A1* | 1/2017 | Sherstyuk | H01M 10/42 |
| 2017/0085115 A1* | 3/2017 | Huang | H02J 50/001 |
| 2017/0093207 A1* | 3/2017 | Park | H02J 9/00 |
| 2017/0108552 A1* | 4/2017 | Roumi | G01R 31/392 |
| 2017/0194673 A1* | 7/2017 | Jeon | H04Q 9/00 |
| 2017/0328957 A1* | 11/2017 | Suzuki | G01R 31/387 |
| 2018/0059192 A1* | 3/2018 | Seo | G01R 31/374 |
| 2018/0090948 A1* | 3/2018 | Park | H01M 10/48 |
| 2018/0111601 A1* | 4/2018 | Kamatani | B60W 10/26 |
| 2018/0123347 A1* | 5/2018 | Shizuno | H02J 7/00 |
| 2018/0354375 A1* | 12/2018 | Dao | B60L 53/16 |
| 2019/0100110 A1* | 4/2019 | Sun | B60L 58/16 |
| 2019/0123394 A1* | 4/2019 | Cha | G01R 31/389 |
| 2019/0237816 A1* | 8/2019 | Kim | H02J 7/0048 |
| 2019/0252735 A1* | 8/2019 | Sung | H01M 10/425 |
| 2019/0260097 A1* | 8/2019 | Kwon | H02J 7/00 |
| 2019/0265304 A1* | 8/2019 | Kim | H02J 7/00 |
| 2019/0273293 A1* | 9/2019 | Kim | H01M 10/425 |
| 2019/0305386 A1* | 10/2019 | Lee | G01R 31/388 |
| 2019/0319481 A1* | 10/2019 | Jin | H02H 7/26 |
| 2019/0356025 A1* | 11/2019 | Sung | H02J 7/00 |
| 2019/0356143 A1* | 11/2019 | Lee | H01M 10/4285 |
| 2019/0361075 A1* | 11/2019 | Lee | H01M 10/4207 |
| 2019/0377029 A1* | 12/2019 | Shiiyama | G06Q 10/20 |
| 2019/0379212 A1* | 12/2019 | Cho | G06N 3/088 |
| 2020/0003844 A1* | 1/2020 | Lim | G01R 31/367 |
| 2020/0018799 A1* | 1/2020 | Lim | G01R 31/392 |
| 2020/0036194 A1* | 1/2020 | Park | H01M 10/482 |
| 2020/0041569 A1* | 2/2020 | Roumi | G01R 31/396 |
| 2020/0099222 A1* | 3/2020 | Parmar | H02J 7/00304 |
| 2020/0106278 A1* | 4/2020 | Sung | H02J 7/0031 |
| 2020/0127458 A1* | 4/2020 | Kato | H02M 1/126 |
| 2020/0169089 A1* | 5/2020 | Lee | H02J 1/002 |
| 2020/0182943 A1* | 6/2020 | Lim | B60L 58/13 |
| 2020/0244075 A1* | 7/2020 | Park | H02J 7/007182 |
| 2020/0408846 A1* | 12/2020 | Bae | H01M 10/48 |
| 2021/0013731 A1* | 1/2021 | Choe | G01R 31/367 |
| 2021/0050729 A1* | 2/2021 | Arvind | H02J 7/007188 |
| 2021/0082480 A1* | 3/2021 | Sung | H01M 10/42 |
| 2021/0184270 A1* | 6/2021 | Sung | H01M 10/48 |
| 2021/0190878 A1* | 6/2021 | Lee | G01R 31/3648 |
| 2021/0194253 A1* | 6/2021 | Lim | G01R 31/3835 |
| 2021/0257840 A1* | 8/2021 | Fauteux | H01M 10/06 |
| 2021/0278472 A1* | 9/2021 | Sakai | H01M 10/4285 |
| 2021/0293889 A1* | 9/2021 | Roumi | G01R 31/396 |
| 2021/0320507 A1* | 10/2021 | Hensley | H02J 7/007 |
| 2021/0336301 A1* | 10/2021 | Hwang | H01M 10/425 |
| 2021/0399352 A1* | 12/2021 | Kamel Ahmed | H02J 7/007182 |
| 2022/0006313 A1* | 1/2022 | Lim | G01R 31/367 |
| 2022/0006314 A1* | 1/2022 | Lim | H01M 10/443 |
| 2022/0029204 A1* | 1/2022 | Yang | H01M 50/224 |
| 2022/0091982 A1* | 3/2022 | Choi | H02J 7/005 |
| 2022/0187379 A1* | 6/2022 | Lee | B60L 58/12 |
| 2022/0231515 A1* | 7/2022 | Bae | H02J 7/005 |
| 2022/0263328 A1* | 8/2022 | Jung | H02J 7/0048 |
| 2022/0294252 A1* | 9/2022 | Cho | H02J 7/00712 |

FOREIGN PATENT DOCUMENTS

| | | |
|---|---|---|
| KR | 10-2015-0087958 A | 7/2015 |
| KR | 10-2018-0023924 A | 3/2018 |
| KR | 10-2018-0066732 A | 6/2018 |
| KR | 10-1918625 B1 | 11/2018 |
| KR | 10-1923958 B1 | 11/2018 |
| KR | 10-2018-0136177 A | 12/2018 |

\* cited by examiner

ENERGY HUB FOR ENERGY STORAGE SYSTEM RACKS BASED ON SOC AND SOH

CROSS-REFERENCE TO RELATED APPLICATIONS

This application claims the priority benefit of Korean Patent Application No. 10-2019-0095016, filed on Aug. 5, 2019, in the Korean Intellectual Property Office, the disclosure of which is incorporated herein in its entirety by reference.

TECHNICAL FIELD

The present invention relates to an energy hub apparatus and an energy management method for relaying and storing energy in charging and discharging power in an ESS rack.

BACKGROUND ART

Recently, research and development on secondary batteries have been actively conducted. Here, the secondary batteries, as batteries that can be charged and discharged, mean that they include conventional Ni/Cd batteries and Ni/MH batteries, and recent lithium ion batteries. Among the secondary batteries, the lithium ion battery has an advantage that the energy density is much higher than that of the conventional Ni/Cd battery and Ni/MH battery, and further, the lithium ion battery can be manufactured with a tendency of a small size so that it is used as a power source for a mobile apparatus. The usage range of such a lithium ion battery extends as a power source for electric vehicles, so that the lithium ion battery attracts attention as a next generation energy storage medium.

In addition, a secondary battery is generally used as a battery pack including a battery module in which a plurality of battery cells is connected in series and/or in parallel. And, a state and an operation of a battery pack are managed and controlled by a battery management system (BMS).

In particular, an Energy Storage System (ESS) is used to devise a mobile ESS in that existing gasoline vehicles, liquefied natural gas (LNG) vessels/carriers/tank ships, and oil tankers transport energy materials. At this time, it is necessary to maintain the ESS in a high charging state for a long period of time.

DISCLOSURE

Technical Problem

In the present invention, since a mobile ESS needs to maintain a high charging state for a long period of time during long-term movement, an energy hub apparatus can be used to solve this.

Technical Solution

According to an embodiment of the present invention, an energy hub apparatus includes: a first communicator configured to receive respective state of charge (SOC) information and state of health (SOH) information from a plurality of battery management systems (BMS), each BMS being configured to monitor and control an ESS rack; a controller configured to determine at least one ESS rack to perform discharging or charging using at least one of load output information, SOC information, and SOH information received from an external device; and an energy storage configured to receive power from the at least one ESS rack among the plurality of ESS racks and transmit the power to an external load.

According to an embodiment of the present invention, the energy hub apparatus further includes a second communicator configured to receive the load output information from the external device and to transmit the load output information to the controller, wherein when the controller controls discharge of the at least one ESS rack, the controller sets a number of ESS racks among the plurality of ESS racks to perform discharging using the received load output information and selects the at least one ESS rack among the number of ESS racks to perform discharging using the SOC information and the SOH information, and when the load output information is not satisfied by considering an SOC value of each of the discharging ESS racks for the set number of ESS racks, the controller resets the number of ESS racks to perform discharging.

In the energy hub apparatus according to an embodiment of the present invention, the controller further uses a number of discharges of the plurality of ESS racks when selecting the discharging ESS rack.

The energy hub apparatus according to an embodiment of the present invention further includes a power receiver configured to receive power from the at least one ESS rack, the energy storage stores power received from the power receiver and outputs power to the external load according to the load output information, the load output information includes output voltage and output current.

The energy hub apparatus according to an embodiment of the present invention further includes a switch configured to switch from an off state to an on state to receive power from the at least one ESS rack; and a voltage converter configured to convert power received from the at least one ESS rack into a chargeable voltage for the enemy storage.

In the energy hub apparatus according to an embodiment of the present invention, when the controller controls charging of the at least one ESS rack, the energy storage is charged by receiving power from a power supply, and the controller determines, as an at least one charging ESS rack, the at least one ESS rack in which the SOC is smaller than a preset first value and the SOH is larger than a second preset value among the plurality of ESS racks.

The energy hub apparatus according to an embodiment of the present invention further includes a switch configured to switch from an off state to an on state in order to charge the at least one ESS rack selected as the charging ESS rack, and when the switch is switched to the on state, the charging ESS rack is charged by the power stored in the energy storage.

The energy hub apparatus according to an embodiment of the present invention, the controller is further configured to diagnose whether an abnormality occurs in the at least one ESS rack performing discharging or charging while the at least one ESS rack is performing discharging or charging, and when at least one of an abnormal current, an abnormal voltage, or an abnormal output path occurs in the at least one ESS rack performing discharging or charging, the switch switches from the on state to the off state to stop discharging or charging of the at least one ESS rack in which an abnormality occurs.

An energy management method according to an embodiment of the present invention includes: receiving, by an energy hub apparatus, SOC information and SOH information from a plurality of BMSs, each BMS monitors and controls an ESS; determining, by the energy hub apparatus, at least one ESS rack to perform discharging or charging among the plurality of ESS racks using at least one of load output information received from an external device, the SOC information, and SOH information, storing energy, by the energy hub apparatus, by receiving power from the at least one ESS rack among the plurality of ESS racks; and transmitting, by the energy hub apparatus, the stored energy to an external load.

In the energy management method according to an embodiment of the present invention, the determining of the at least one ESS rack includes: setting a number of discharging ESS racks to perform discharging using the load output information; and determining at least one discharging ESS rack to perform discharge using the SOC information and the SOH information of each ESS rack, and the energy management method further includes re-performing setting the number of discharging ESS racks to perform discharging if the load output information is not satisfied even when considering a SOC value of each of the discharging ESS racks for the set number of ESS racks.

In the energy management method according to an embodiment of the present invention, in the determining of the at least one discharging ESS rack, the number of discharges of each ESS rack is further used.

In the energy management method according to an embodiment of the present invention, in the storing of the energy, the power received from the at least one discharging ESS rack is converted to a preset voltage to store the power, and in the transmitting of the stored energy to the external load, the stored energy is transmitted according to the load output information.

The energy management method according to an embodiment of the present invention further includes: applying power to the energy hub apparatus from an external power source; and performing charging by determining the at least one ESS rack to perform charging using the charged energy based on the SOC information and the SOH information, when the at least one ESS rack determined to perform charging has a SOC smaller than a first preset value, and an SOH is greater than a second preset value.

Advantageous Effects

Through the energy hub apparatus and the energy management method according to an embodiment of the present invention, there is an effect that the ESS in a high state of charge can be preserved for a long time.

BEST MODE

Hereinafter, various embodiments of the present invention will be described in detail with reference to the accompanying drawings. In this document, the same reference numerals are used for the same components in the drawings, and duplicate descriptions for the same components are omitted.

For various embodiments of the present invention disclosed in this document, specific structural or functional descriptions are exemplified only for the purpose of explaining an embodiment of the present invention, and various embodiments of the present invention may be implemented in various forms and should not be construed as being limited to the embodiments described in this document.

The terms such as "1st", "2nd", "first", "second", and the like used herein may refer to modifying various different elements of various embodiments of the present disclosure, but do not limit the elements. For example, a first component may be referred to as a second component and vice versa without departing from the technical scope of the present invention.

Terms used herein is for the purpose of describing particular example embodiments only and is not intended to be limiting of the scope of other embodiments. The terms of a singular form may include plural forms unless they have a clearly different meaning in the context.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood as having an ideal or excessively formal meaning. In any cases, even the terms defined in this specification cannot be interpreted as excluding embodiments of the present invention.

Figure 1:
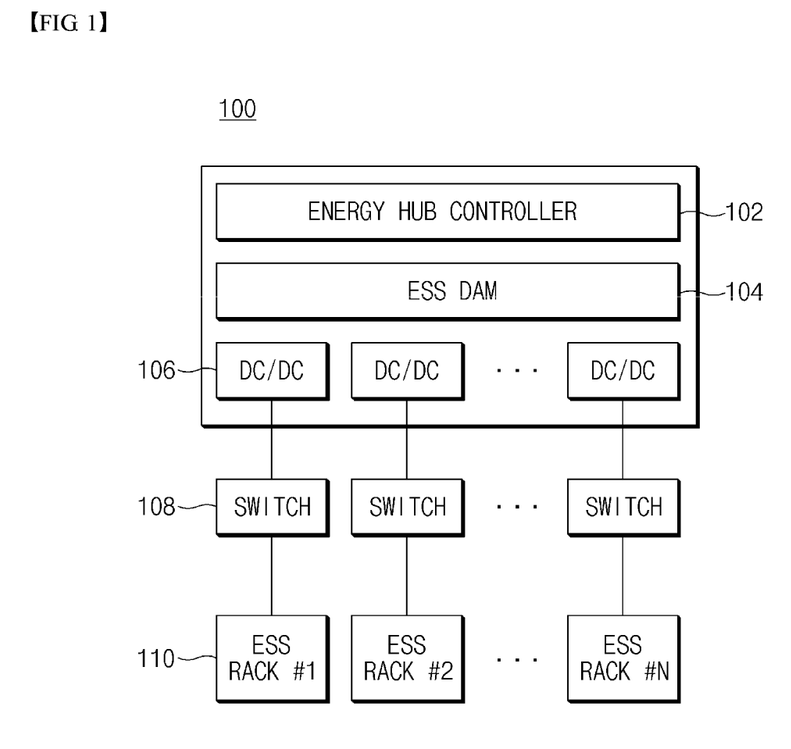
FIG. 1 is a simplified configuration diagram of an energy hub apparatus according to an embodiment of the present invention.

FIG. 1 is a simplified configuration diagram of an energy hub apparatus according to an embodiment of the present invention.

An energy hub apparatus 100 includes an energy hub controller 102, an ESS dam 104, and a DC/DC converter 106. Accordingly, there are DC/DC converters whose number corresponds to the number of corresponding ESS racks. The DC/DC converter 106 is connected to each ESS rack 110 through a switch element 108.

The operation of the energy hub apparatus will be schematically described through the configuration of the enemy hub apparatus 100 of FIG. 1.

Load output information is received from an external device. The received load output information may include voltage, current, or power quality of output power. Based on the received load output information, the energy hub controller 102 sets the number of ESS racks to perform discharging. After setting the number of ESS racks, the energy hub controller 102 determines an ESS rack to perform discharging by using SOC information, SOH information, and the number of discharges of each ESS rack.

Specifically, among the plurality of ESS racks related to the energy hub apparatus 100, the ESS rack in which the SOC value is greater than the preset first value, the SOH value is compared between the ESS racks, and there is a relatively small number of discharges is determined as the final discharging ESS rack.

SOH information between each ESS rack selects excellent SOH through relative comparison. In addition, it is also possible to preset a condition in which only the ESS rack is used for discharging when the SOH is greater than the second preset value.

In addition, among a plurality of ESS racks, an ESS rack with a small (e.g., lowest) number of discharges may be selected as a discharging ESS rack with priority. Alternatively, an ESS rack discharged less than a preset number of times can be selected.

That is, based on the received load output information, the energy hub controller may select an optimal ESS rack to perform discharging using SOC information, SOH information, and discharge number of each of the plurality of ESS racks.

However, if it is determined that the SOC information of each ESS rack does not satisfy the load output information according to the number of determined ESS racks, the energy hub controller 102 resets the number of discharging ESS racks, and again determines an optimal ESS rack to perform discharging by using SOC information, SOH information, and the number of discharges of each of the plurality of ESS racks.

When the optimum ESS rack to perform discharging is determined, the switch 108 connected to the corresponding ESS rack is turned on. When the switch 108 is turned on, the energy hub apparatus 100 receives power from the ESS rack and the ESS dam 104 stores the energy.

However, the DC/DC conversion unit 106 is located between each of the plurality of ESS racks and the ESS dam 104, respectively, so that before energy is stored in the ESS dam 104, the DC/DC conversion unit 106 converts the voltage of power received from the ESS rack into a voltage that can be charged to the ESS darn 104.

The ESS dam 104, which is charged with energy by receiving power from the ESS rack, outputs power to an external load according to the received load output information.

Meanwhile, the ESS dam 104 may be charged by applying power from an external power source. At least one ESS rack among a plurality of ESS racks connected to the energy hub apparatus 100 may be charged by using the energy charged in the ESS dam 104.

At this time, the energy hub controller 102 selects an ESS rack to perform charging among a plurality of connected ESS racks. The energy hub controller 102 determines, as a charging ESS rack, an ESS rack having an SOC smaller than a first preset value and a SOH greater than a second preset value among the plurality of ESS racks.

When determining the charging ESS rack to perform charging, if the SOH is smaller than the second preset value, it is determined as a defective ESS rack. Because the defective ESS rack needs maintenance later, it does not require charging, so that it is not to perform charging. In addition, such a defective ESS can be a subject of diagnosis.

The energy stored in the ESS dam 104 is transmitted to the charging ESS rack determined as a charging target. At this time, charging proceeds according to the state of the ESS rack. For example, an ESS rack capable of fast charging is performed with specialized charging with good SOH, and an ESS rack with a large number of uses or an ESS rack with a relatively low SOH is a rack requiring slow charging management.

In addition, the energy huh apparatus 100 may detect whether an unintended abnormal value is derived when charging or discharging a related ESS rack.

The energy hub apparatus 100 diagnoses at least one ESS rack performing charging or discharging in order to determine the ESS rack in which an abnormality occurs.

When a situation in which an abnormal value rather than an intended value is derived from a charging or discharging situation is detected, the energy hub apparatus 100 diagnoses an ESS rack in which an abnormal situation occurs. First, the energy hub apparatus 100 diagnoses whether an unintended current occurs in a specific ESS rack. For example, a situation in which an unintended current occurs may be a case where a charging current flows in reverse from an ESS rack being discharged or a discharging current flows from an ESS rack being charged. In addition, the energy hub apparatus 100 checks whether the ESS rack voltage is an intended value. The case where the ESS rack applies an unintended voltage may include overvoltage, undervoltage, short circuit, or open circuit. In addition, the energy hub apparatus 100 diagnoses whether the ESS rack forms a normal output path. For example, abnormal circuits include short circuits and open circuits.

When it is determined that a specific ESS rack among at least one ESS rack in which the energy hub apparatus 100 is charging or discharging is not normal, the switch element of the corresponding ESS rack is switched from the on state to the off state.

Figure 2:
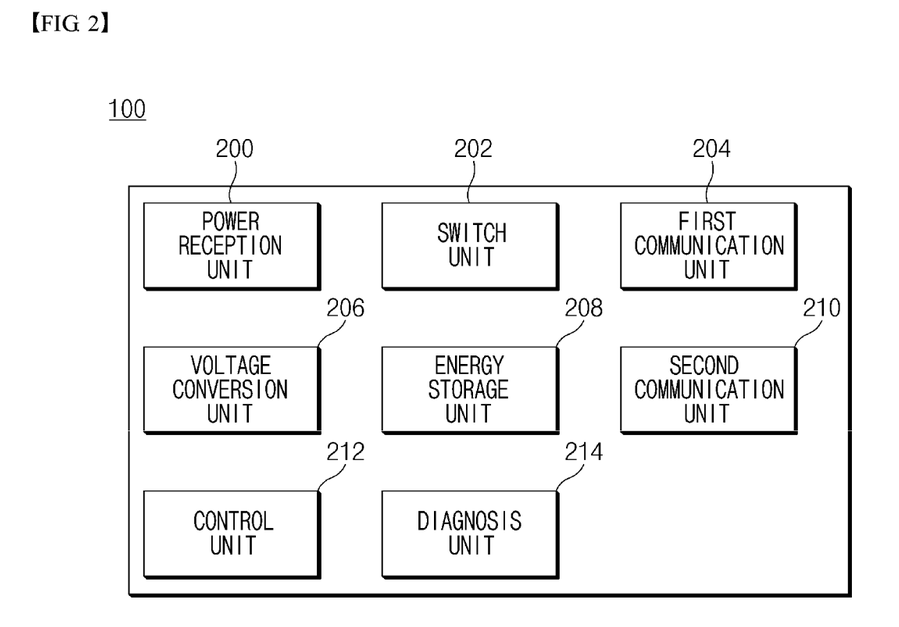
FIG. 2 is a simplified configuration diagram of an energy hub apparatus according to an embodiment of the present invention.

FIG. 2 is a block diagram of another energy hub apparatus according to an embodiment of the present invention.

The energy hub apparatus 100 includes a power reception unit/power receiver 200, a switch unit/switch 202, a first communication unit/communicator 204, a voltage conversion unit/voltage converter 206, an energy storage unit/energy storage 208, a second communication unit/communicator 210, a control unit (e.g., controller/processor) 212, and a diagnosis unit 214. Here, the control unit 212 corresponds to the energy hub controller 102 in FIG. 1, the energy storage unit 208 corresponds to the ESS dam 104, and the voltage conversion unit 206 corresponds to the DC/DC conversion unit 106.

The energy hub apparatus 100 is connected to a plurality of ESS racks, as shown in FIG. 1. The energy hub apparatus 100 receives or transmits power from or to at least one ESS rack among ESS racks connected to perform charging or discharging.

When the ESS rack to perform charging or discharging is determined, the power reception unit 200 receives power or transmits power from or to the corresponding ESS rack.

When determining at least one ESS rack to perform discharging in order to transmit power to the load among a plurality of ESS racks connected to the control unit 212, the switch unit 202 switches the switch element connected to the corresponding ESS rack from an off state to an on state. At this time, the switch element may be connected between the ESS rack and the power reception unit 200.

Or, when determining at least one ESS rack to perform charging among a plurality of ESS racks connected to the control unit 212, the switch unit 202 switches the switch element connected to the corresponding ESS rack from an off state to an on state.

Or, when the control unit 212 detects an abnormality in a specific ESS rack performing discharging or charging, the switch unit 202 switches the switch element connected to the corresponding ESS rack from an on state to an oft state.

The first communication unit 204 receives SOC information and SOH information of each ESS rack from a plurality of ESS racks. In addition, the first communication unit 204 may receive voltage or current information of each ESS rack from a plurality of ESS racks.

The SOC information and SOH information of the plurality of ESS racks received by the first communication unit 204 are transmitted to the control unit 212 to determine the ESS rack to perform discharging or charging.

The voltage conversion unit 206 converts the voltage of the power received from the power reception unit 200 into a voltage that can be charged to the energy storage unit 208. The power reception unit 200 may be a plurality of configurations corresponding to each of a plurality of ESS racks, and the voltage conversion unit 206 may also be a plurality of configurations corresponding to each of a plurality of ESS racks.

The energy storage unit 208 may store power received from at least one ESS rack performing discharge. Power received from the at least one ESS rack is converted into a voltage that can be stored in the energy storage unit 208 in the voltage conversion unit 206 and transmitted to the energy storage unit 208. The power stored in the energy storage unit 208 is transmitted to the load according to the load output information previously received by the external load.

In addition, the energy storage unit 208 may charge the ESS rack by transmitting power to at least one ESS rack that performs charging. When an ESS rack to perform charging is determined based on SOC information and SOH information received from a plurality of ESS racks, power can be transmitted to the corresponding ESS rack. The power can perform charging according to the characteristics of the ESS rack. In the case of fast charging or frequent use of the ESS rack, the ESS rack with a good SOH can be charged by a slow charging management method.

The second communication unit 210 receives load output information from an external device. The load output information may be voltage, current, or power quality of output power. Based on the load output information received from the second communication unit 210, the ESS rack to perform discharging is determined, and the energy stored in the energy storage unit 208 transmits power to the external load.

When receiving the load output information from the second communication unit, the control unit 212 determines an ESS rack to perform discharging among a plurality of connected ESS racks. The control unit 212 determines an ESS rack to perform discharging based on the load output information. Then, the control unit 212 determines a discharging ESS rack to perform discharging using the SOC information, SOH information, and the number of discharges of each of the received plurality of ESS racks. The control unit 212 uses SOH information of a plurality of ESS racks to first discharge an ESS rack having a relatively excellent SOH value. In this case, by setting the SOH value in advance, it is possible to set to discharge only ESS racks having an SOH value equal to or greater than the preset value. In addition, the control unit 212 may determine the discharging ESS rack in consideration of the number of times of use among the plurality of ESS racks. Through the relative comparison between ESS racks, the discharging ESS rack can be determined in the order of the ESS rack with the lowest number of uses (the number of discharges). At this time, instead of a relative comparison, ESS racks used less than a preset number of times can be set as priority. In addition, the control unit 212 may determine the discharging ESS rack in consideration of SOC among a plurality of ESS racks. However, even if a plurality of ESS racks are combined with the determined number of discharging ESS racks, when it is determined that the power to be outputted to the load is not satisfied even when the SOCs of each ESS rack are combined, the control unit 212 adjusts the number of discharging ESS racks to perform discharging again. Subsequently, the control unit 212 determines the ESS rack to perform discharging again with the adjusted number based on SOC information, the number of discharges, and SOH information.

When the control unit 212 determines the discharging ESS rack, the switch unit 202 causes the switch element connected to the corresponding ESS rack to be switched from an off state to an on state.

The control unit 212 may perform charging of the ESS rack. Specifically, when power is applied to the energy storage unit 208 from an external power source and the energy storage unit 208 is charged, the ESS rack to perform charging may be determined using the charged power.

The control unit 212 may determine using SOC information and SOH information of a plurality of connected ESS racks in order to determine an ESS rack to perform charging. Specifically, if the SOC value of the plurality of ESS racks is smaller than a preset value, the charging ESS rack to perform charging may be a target. In addition, when the SOH value of the plurality of ESS racks is greater than a preset value, the charging ESS rack to perform charging can be targeted. That is, if the SOC value among the plurality of ESS racks is smaller than the first preset value and the SOH value is greater than the second preset value, the charging ESS rack is determined. At this time, the SOC value of the ESS rack may not be considered, and only the SOH value may be considered to determine the charging ESS rack.

Among the plurality of ESS racks, an ESS rack whose SOH value is lower than the preset second value is a defective rack and may be taken care of at a later stage of diagnosis. When determining the charging ESS rack, the control unit 212 causes the switch unit 202 to switch the switch element connected to the corresponding ESS rack from an off state to an on state.

In addition, the control unit 212 controls to perform charging according to the state of the charging ESS rack. For example, an ESS rack with good SOH can be controlled to perform fast charging, and an ESS rack with a large number of uses or relatively poor SOH can be controlled to be charged slowly.

The diagnosis unit 214 diagnoses an ESS rack performing charging or discharging when an abnormal current value or voltage value is detected during charging or discharging.

Specifically, the diagnosis unit 214 detects an unintended current in the ESS rack performing charging or discharging. For example, it detects the case where the charging current flows reversely from the ESS rack performing discharging or the discharging current flows reversely from the ESS rack performing charging.

In addition, the diagnosis unit 214 detects an unintended voltage in the ESS rack performing charging or discharging. For example, when an overvoltage, undervoltage, short circuit, or open circuit occurs in the corresponding ESS rack, an unintended voltage may be detected. Alternatively, an abnormality may be detected even in the case of a short or open circuit other than a normal output path.

When the diagnosis unit 214 detects an unintended current or voltage in an ESS rack performing charging or discharging, the diagnosis unit 214 transmits an abnormal signal of the corresponding ESS rack to the control unit 212.

The control unit 212 receiving an abnormal signal of a specific ESS rack from the diagnosis unit 214 causes the switch unit 202 to switch the switch element of the corresponding ESS rack from an ON state to an OFF state.

Figure 3:
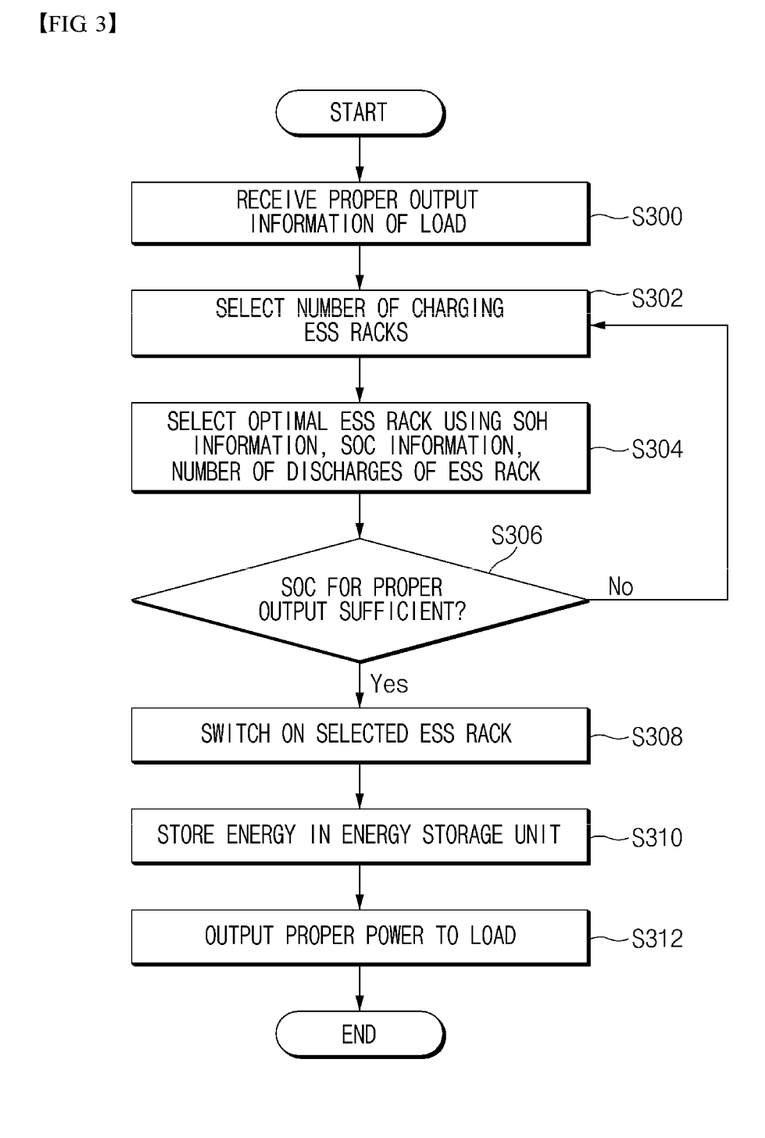
FIG. 3 is a flowchart of an energy output method according to an embodiment of the present invention.

FIG. 3 is a flowchart of an energy output method according to an embodiment of the present invention.

The second communication unit 210 receives load output information from an external device (S300). The load output information may be voltage, current, or power quality of output power. Based on the load output information received from the second communication unit, the ESS rack to perform discharging is determined, and the energy stored in the energy storage unit 208 transmits power to the external load.

When receiving the load output information from the second communication unit, the control unit 212 selects/determines the number of ESS racks to perform discharging among a plurality of connected ESS racks (S302).

Subsequently, based on the load output information, the control unit 212 selects/determines an (optimal) ESS rack to perform discharging using SOH, SOC, and the number of discharges of each ESS rack (S304).

The control unit 212 uses SOH information of a plurality of ESS racks to first discharge an ESS rack having a relatively excellent SOH value. In this case, by setting the SOH value in advance, it is possible to set to discharge only ESS racks having an SOH value equal to or greater than the preset value. In addition, the control unit 212 may determine the discharging ESS rack in consideration of the number of times of use among the plurality of ESS racks. Through the relative comparison between ESS racks, the discharging ESS rack can be determined in the order of the ESS rack with the lowest number of uses (e.g., the number of discharges). At this time, instead of a relative comparison, ESS racks used less than a preset number of times can be set as priority. In addition, the control unit 212 may determine the discharging ESS rack in consideration of SOC among a plurality of ESS racks.

The control unit 212 determines whether the SOC of the ESS rack is sufficient based on the proper load output (S306).

Even if multiple ESS racks are combined with the determined number of discharging ESS racks, when the control unit 212 determines that the power to be outputted to the load is not satisfied even when the SOCs of each ESS rack are combined, the control unit 212 adjusts the number of discharging ESS racks to perform discharging again. Therefore, the control unit 212 determines the number of ESS racks to perform discharging from among the plurality of ESS racks connected again (S302).

If the control unit 212 determines that the SOC of the ESS rack is sufficient due to the proper load output, the control unit 212 switches the switch of the ESS rack whose discharge is determined from the off state to the on state (S308).

When the control unit 212 determines the discharging ESS rack, the switch unit 202 causes the switch element connected to the corresponding ESS rack to be switched from an off state to an on state. Accordingly, when determining at least one ESS rack to perform discharging in order to deliver power to the load among a plurality of ESS racks connected to the control unit 212, the switch unit 202 switches the switch element connected to the corresponding ESS rack from an off state to an on state.

When the switch element connected to the discharging ESS rack is turned on, power is transmitted from each discharging ESS rack to each power reception unit 200. Accordingly, the voltage conversion unit 206 converts the voltage of the power received from the power reception unit 200 into a voltage that can be charged to the energy storage unit 208. The power reception unit 200 may be a plurality of configurations corresponding to each of a plurality of ESS racks, and the voltage conversion unit 206 may also be a plurality of configurations corresponding to each of a plurality of ESS racks.

The switch element connected to the discharging ESS rack is turned on, and after receiving power from the discharging ESS rack and converting it to a voltage that can be stored in the energy storage unit 208, the voltage is stored in the energy storage unit 208 (S310).

Then, the power stored in the energy storage unit 208 is transmitted to the load according to the load output information previously received by the external load (S312).

Figure 4:
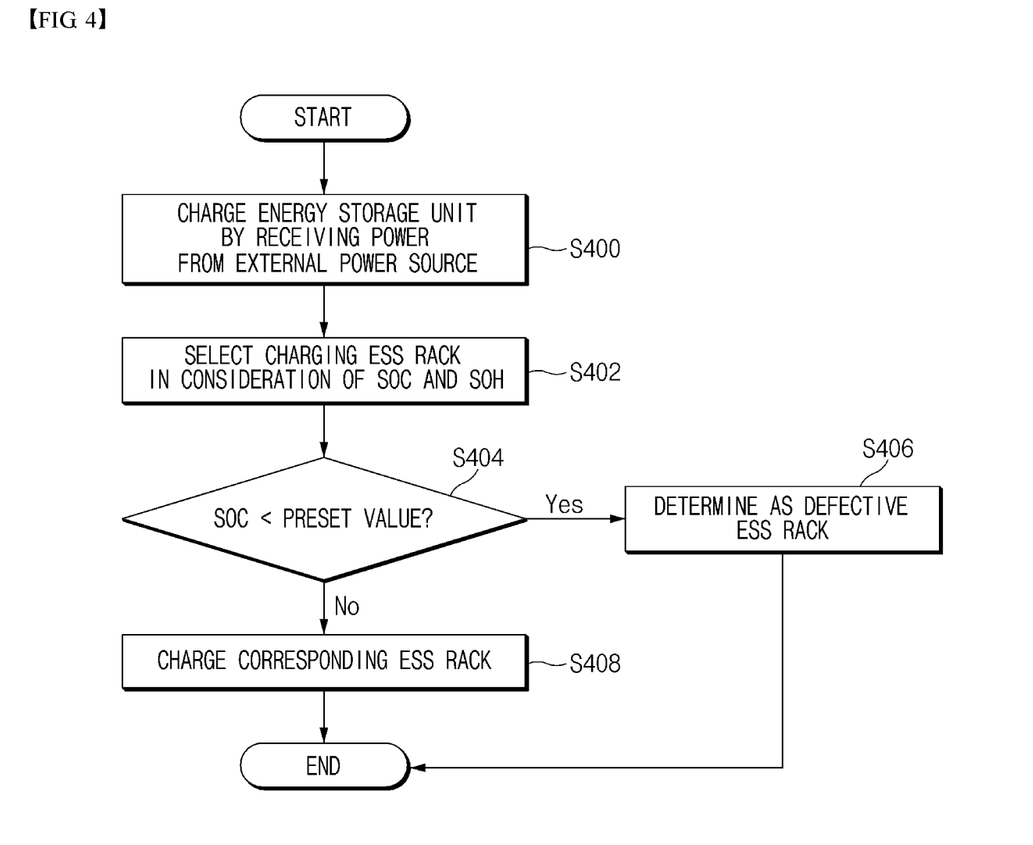
FIG. 4 is a flowchart of a method of charging an ESS rack according to an embodiment of the present invention.

FIG. 4 is a flowchart of a method of charging an ESS rack according to an embodiment of the present invention.

The control unit 212 controls power to be transmitted from an external power source to the energy storage unit 208 when charging the connected ESS rack. Accordingly, the energy storage unit 208 is charged by receiving power from an external power source (S400).

Subsequently, the control unit 212 determines an ESS rack to perform charging using the power stored in the energy storage unit 208 based on each of SOC information and SOH information (S402).

The control unit may determine using SOC information and SOH information of a plurality of connected ESS racks in order to determine an ESS rack to perform charging. Specifically, if the SOC value of the plurality of ESS racks is smaller than a preset value, the charging ESS rack to perform charging may be a target. In addition, when the SOH value of the plurality of ESS racks is greater than a preset value, the charging ESS rack to perform charging can be targeted. That is, if the SOC value among the plurality of ESS racks is smaller than the first preset value and the SOH value is greater than the second preset value, the charging ESS rack is determined. At this time, the SOC value of the ESS rack may not be considered, and only the SOH value may be considered to determine the charging ESS rack.

Here, the control unit 212 compares the SOH of the ESS rack with a preset second value (S404). If the SOH of a specific ESS rack is less than a preset value, the corresponding ESS rack is determined as a defective ESS rack and does not proceed with charging (S406).

When determining the charging ESS rack, the control unit 212 causes the switch unit 202 to switch the switch element connected to the corresponding ESS rack from an off state to an on state. Accordingly, the ESS rack is charged (S408).

In addition, the control unit 212 controls to perform charging according to the state of the charging ESS rack. For example, an ESS rack with good SOH can be controlled to perform fast charging, and an ESS rack with a large number of uses or relatively poor SOH can be controlled to he charged slowly.

Figure 5:
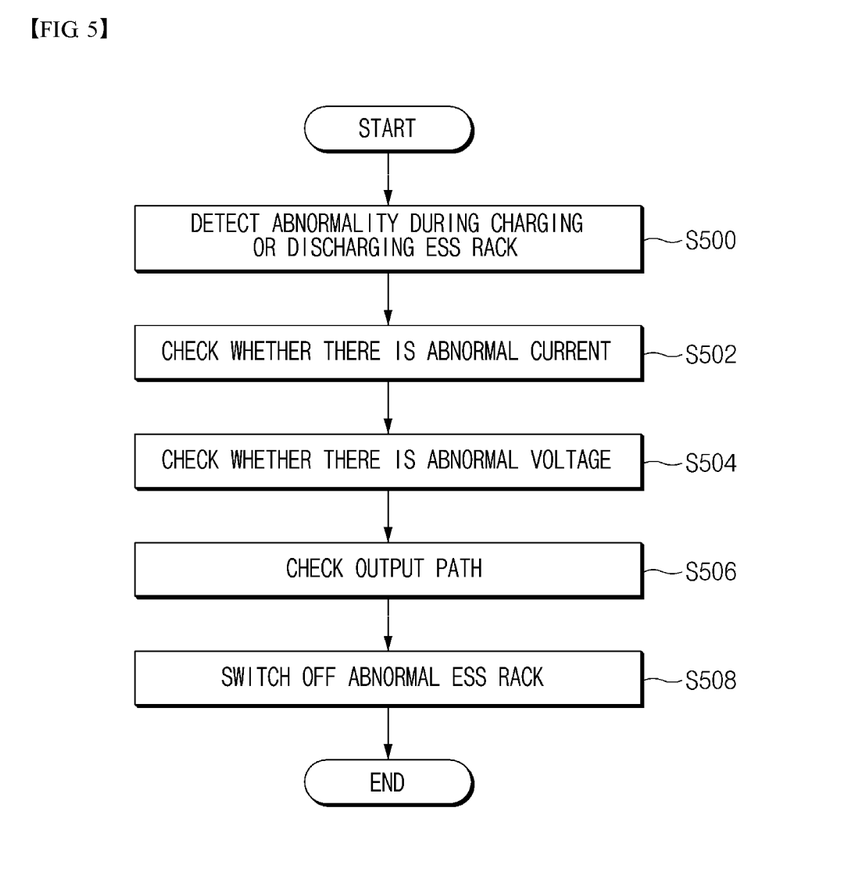
FIG. 5 is a flowchart of a method for diagnosing an ESS rack according to an embodiment of the present invention.

FIG. 5 is a flowchart of a method for diagnosing an ESS rack according to an embodiment of the present invention.

The diagnosis unit 214 diagnoses an ESS rack performing charging or discharging when an abnormal current value or voltage value is detected during charging or discharging (S500).

Subsequently, the diagnosis unit 214 diagnoses/checks whether an abnormal current is generated in any of the ESS racks performing charging or discharging (S502).

Specifically, when the diagnosis unit 214 detects an unintended current in the ESS rack performing charging or discharging, it may determine that an abnormality occurs in the corresponding rack. For example, it detects the case where the charging current flows reversely from the ESS rack performing discharging or the discharging current flows reversely from the ESS rack performing charging.

Further, when the diagnosis unit 214 detects/checks for an unintended voltage in the ESS rack performing charging or discharging, it may determine that an abnormality occurs in the corresponding rack (S504). For example, when an overvoltage, undervoltage, short circuit, or open circuit occurs in the corresponding ESS rack, an unintended voltage may be detected.

In addition, the diagnosis unit 214 diagnoses/checks whether there is an output path abnormality of the ESS rack performing charging or discharging (S506).

When at least one of a current error, a voltage error, or an output path error is diagnosed in the ESS rack performing charging or discharging, the switch connected to the corresponding ESS rack is turned off (e.g., the abnormal ESS rack is switched off) (S508).

In the above, even though all the components constituting the embodiments of the present invention are described as being combined into one or operating in combination, the present invention is not necessarily limited to these embodiments. That is, within the scope of the object of the present invention, all of the constituent elements may be selectively combined and operated in one or more.

In addition, the terms "include", "compose", or "have" as described above means that the corresponding component can be intrinsic, unless otherwise stated, so that it should be interpreted that other components may be further included, not excluded. All terms, including technical or scientific terms, can be interpreted as having the same meaning as generally understood by a person skilled in the art to which the present invention belongs, unless otherwise defined. Generally used terms, such as predefined terms, should be interpreted as being consistent with the contextual meaning of the related art, and are not to be interpreted in an ideal or excessively formal sense, unless explicitly defined in the present invention.

The above description is merely illustrative of the technical idea of the present invention, and those skilled in the art to which the present invention pertains will be able to make various modifications and variations without departing from the essential characteristics of the present invention. Therefore, the embodiments disclosed in the present invention are not intended to limit the technical spirit of the present invention, but to explain, and the scope of the technical spirit of the present invention is not limited by these embodiments. The scope of protection of the present invention should be construed according to the following claims, and all technical ideas falling within the scope of the same shall be construed as falling within the scope of the present invention.

The invention claimed is:

1. An energy hub apparatus, comprising:
   a first communicator configured to receive respective state of charge (SOC) information and state of health (SOH) information from a plurality of battery management systems (BMS), each BMS being configured to monitor and control an energy storage system (ESS) rack that is available;
   an energy storage configured to:
      receive power from the plurality of ESS racks,
      receive power from an external power source,
      output power to an external device, and
      output power to the plurality of ESS racks; and
   a controller configured to:
      receive load information from the external device, the load information including a required load output;
      select at least one ESS rack that is optimal among the plurality of ESS racks to perform discharging or charging using the SOC information, the SOH information and a number of discharges of each ESS rack;
      determine whether the at least one ESS rack is sufficient to satisfy the required load output;
      adjust a number of selected at least one ESS rack among the plurality of ESS racks to output power;
      control discharge of the selected at least one ESS rack to the energy storage; and from the energy storage to the external device,
      charge the energy storage, by receiving power from the external power source;
      select an ESS rack among the plurality of ESS racks to charge;
      determine of the selected ESS rack is defective if the SOC of the ESS rack is below a preset value; and
      charge, by the energy storage, the selected ESS rack, if the SOC of the selected ESS rack is above the preset value,
      wherein if the selected ESS rack has a relatively high SOH, the selected ESS rack is fast charged, and
      wherein if the selected ESS rack has a relatively low SOH, the selected ESS rack is slow charged.

2. The energy hub apparatus of claim 1, further comprising a second communicator configured to receive the load output information from the external device and to transmit the load output information to the controller, and
   wherein when the load output information is not satisfied by considering an SOC value of the selected at least one ESS rack, the controller resets the number of selected at least one ESS rack to perform discharging.

3. The energy hub apparatus of claim 1, wherein the controller is further configured to not charge the selected ESS rack if the SOC of the ESS rack is below the preset value.

4. The energy hub apparatus of claim 1, further comprising a plurality of DC to DC converters, each DC to DC converter being located between each a respective one of the ESS racks and the energy storage,
   wherein each DC to DC converter is configured to:
      convert a voltage of power received from the respective ESS rack; and
      transmit the converted power to the energy storage.

5. The energy hub apparatus of claim 1, wherein when the controller controls charging of the selected at least one ESS rack, the energy storage is charged by receiving power from a power supply, and the controller determines, as an at least one charging ESS rack, the selected at least one ESS rack in which the SOC is smaller than a preset first value and the SOH is larger than a second preset value among the plurality of ESS racks.

6. The energy hub apparatus of claim 5, further comprising a switch configured to switch from an off state to an on state in order to charge the selected at least one ESS rack selected as the charging ESS rack,
   wherein when the switch is switched to the on state, the at least one charging ESS rack is charged by the power stored in the energy storage.

7. The energy hub apparatus of claim 1, further comprising a power receiver configured to receive power from the selected at least one ESS rack,
   wherein the energy storage stores power received from the power receiver and outputs power to the external device according to the load output information, and
   wherein the load output information comprises output voltage and output current.

8. The energy hub apparatus of claim 7, further comprising:
   a switch configured to switch from an off state to an on state to receive power from the selected at least one ESS rack; and a voltage converter configured to convert power received from the selected at least one ESS rack into a chargeable voltage for the energy storage.

9. The energy hub apparatus of claim 8, wherein the controller is further configured to diagnose whether an abnormality occurs in the selected at least one ESS rack performing discharging or charging while the selected at least one ESS rack is performing discharging or charging, wherein when at least one of an abnormal current, an abnormal voltage, or an abnormal output path occurs in the selected at least one ESS rack performing discharging or charging, the switch switches from the on state to the off state to stop discharging or charging of the selected at least one ESS rack in which an abnormality occurs.

10. An energy management method, comprising:
receiving, by an energy hub apparatus, state of charge (SOC) information and state of health (SOH) information from a plurality of battery management systems (BMSs), each BMS monitors and controls an energy storage system (ESS) rack that is available, the energy hub apparatus including an energy storage;
receiving power, by the energy storage, from an external power source;
receiving, by the energy hub apparatus, load information from an external device, the load information including a required load output;
selecting, by the energy hub apparatus, at least one ESS rack that is optimal to perform discharging or charging among the plurality of ESS racks using the SOC information, the SOH information and a number of discharges of each ESS rack;
determining whether the at least one ESS rack is sufficient to satisfy the required load output;
adjusting a number of selected at least one ESS rack among the plurality of ESS racks to output power;
controlling discharge of the selected at least one ESS rack;
transmitting, by the energy storage of the energy hub apparatus, the stored energy to an external device;
charging the energy storage by receiving power from the external power source;
selecting an ESS rack among the plurality of ESS racks to charge;
determining of the selected ESS rack is defective if the SOC of the ESS rack is below a preset value; and
charging, by the energy storage, the selected ESS rack, if the SOC of the selected ESS rack is above the preset value
wherein if the selected ESS rack has a relatively high SOH, the selected ESS rack is fast charged, and
wherein if the selected ESS rack has a relatively low SOH, the selected ESS rack is slow charged.

11. The energy management method of claim 10, further comprising:
applying power to the energy hub apparatus from an external power source; and
performing charging by selecting the at least one ESS rack to perform charging using the charged energy based on the SOC information and the SOH information,
wherein the selected at least one ESS rack determined to perform charging has a SOC smaller than a first preset value, and a SOH greater than a second preset value.

12. The energy management method of claim 10, further comprising prohibit charging of the selected ESS rack if the selected ESS rack is below the preset value.

13. The energy management method of claim 10, wherein the energy hub apparatus further includes a plurality of DC to DC converters, each DC to DC converter being located between each a respective one of the ESS racks and the energy storage.

14. The energy management method of claim 10, wherein the selecting of the at least one ESS rack comprises:
setting a number of discharging ESS racks to perform discharging using the load output information; and
determining the at least one discharging ESS rack to perform discharge using the SOC information and the SOH information of each ESS rack, and
wherein the method further comprises re-performing setting the number of discharging ESS racks to perform discharging if the load output information is not satisfied even when considering a SOC value of each of the discharging ESS racks for the set number of ESS racks.

15. The energy management method of claim 14, wherein in the storing of the energy, the power received from the selected at least one discharging ESS rack is converted to a preset voltage to store the power, and
wherein in the transmitting of the stored energy to the external device, the stored energy is transmitted according to the load output information.

* * * * *